United States Patent [19]

Hendry

[11] 4,043,715
[45] Aug. 23, 1977

[54] PUMPED INJECTION OF GAS FOR MAKING FOAMED PLASTIC

[75] Inventor: James W. Hendry, Holland, Mich.

[73] Assignee: Ex-Cell-O Corporation, Troy, Mich.

[21] Appl. No.: 582,631

[22] Filed: June 2, 1975

[51] Int. Cl.² .......................................... B29D 27/00
[52] U.S. Cl. ................................. 425/4 R; 264/50; 264/DIG. 83; 425/557; 425/817 R
[58] Field of Search .......... 425/4 R, 4 C, 325, 817 R, 425/, 817 C, 147, 244; 264/328, 329, 40, DIG. 83, 50, 51, 45.9, 46.1; 259/191, 192; 222/135, 145, 559, 413

[56] References Cited

U.S. PATENT DOCUMENTS

| 3,391,051 | 7/1968 | Ehrenfreund et al. | 425/325 X |
| 3,523,988 | 8/1970 | Roehr et al. | 425/4 C X |
| 3,697,204 | 10/1972 | Kyritsis et al. | 425/4 R |
| 3,793,416 | 2/1974 | Finkmann et al. | 425/817 R X |
| 3,975,473 | 8/1976 | Mulvaney | 425/817 C X |
| 3,981,649 | 9/1976 | Shimano et al. | 264/50 X |

FOREIGN PATENT DOCUMENTS

| 521,109 | 3/1955 | Italy | 425/4 C |
| 10,538 | 3/1972 | Japan | 425/817 C |

Primary Examiner—Francis S. Husar
Assistant Examiner—Mark Rosenbaum
Attorney, Agent, or Firm—Blanchard, Flynn, Thiel, Boutell & Tanis

[57] ABSTRACT

Apparatus for making a foamed plastics product. A foamed plastics product is formed by introducing into an at least substantially fully plasticated material a series of discontinuous gaseous bubbles while said plasticating material is under a substantial and often variable pressure, accumulating said material and intermixed bubbles in an injection zone while maintaining said pressure thereon and thereafter injecting said material into a mold whereupon said pressure is sufficiently released to permit expansion of said gas bubbles and the formation of a foam thereby. Said gas is introduced, as aforesaid, by a series of separate injections wherein the pressure on the gas being injected rises from substantially zero to a level potentially in excess of the highest pressure expected to be developed within the plasticating means. Thus, regardless of the pressure existing in the plasticated material at any given moment, gas will be injected into said plastic material when the pressure on the gas attains a suitable differential over the pressure in the plasticated material at any given moment and such injecting will be in substantially uniform quantities regardless of the pressure existing within said plastics material at the time of any given injection thereinto.

The apparatus aspects of the invention contemplate injecting the gaseous material into the plasticated plastics material by a high-speed positive displacement pump, as a piston pump or a diaphragm pump, wherein each stroke of the pump injects one bubble of gas into the plastics material.

12 Claims, 3 Drawing Figures

4,043,715

PUMPED INJECTION OF GAS FOR MAKING FOAMED PLASTIC

FIELD OF THE INVENTION

The invention relates to apparatus for forming a foamed plastics material and refers particularly to such apparatus wherein an inert gas is injected under high pressure as a series of separate bubbles into a flowing quantity of at least substantially fully plasticated plastics material.

BACKGROUND OF THE INVENTION

The concept and advantages of foamed plastics material have been well known to the industry for many years and a great many attempts have been made through a variety of methods and means for forming and molding such material. The strength, lightness and economy of such plastics material are all well known but while many methods have been proposed for creating and molding such material, all of them insofar as I am aware have presented a variety of problems which have not yet been wholly solved. In some instances where gas emitting solid material is premixed with plastic pellets, the operation is expensive, both as a result of the cost of the gas emitting material as well as the cost of such premixing. In some cases, as where gas is introduced at a substantially constant pressure and in a continuous flow into a stream of plasticated plastics material, particularly if the latter is itself at a variable or pulsating pressure, the voids in the foam are of variable size and in some places may even be greatly oversize or entirely lacking.

Therefore, the purposes of the present invention include:

1. To provide apparatus of relatively simple structure which will create and deliver for appropriate shaping a plastic foam having voids of substantially uniform size having a high level of uniformity in size and distribution.
2. To provide apparatus, as aforesaid, which will involve minimum cost and only relatively simple modification in applying same to a wide variety of presently known plastics injection machines.
3. To provide apparatus, as aforesaid, which will utilize a purely gaseous supply for creating the desired foam and will eliminate the expense and inconvenience of using liquid or solid gasifiable material requiring premixing thereof with the plastics material.
4. To provide apparatus, as aforesaid, which will minimize the likelihood of leakage of gas from the machine.

Other objects and purposes of the invention will be apparent to persons acquainted with operations of the type involved here upon inspection of the following drawings and reading of the accompanying specification.

SUMMARY OF THE INVENTION

Figure 1:
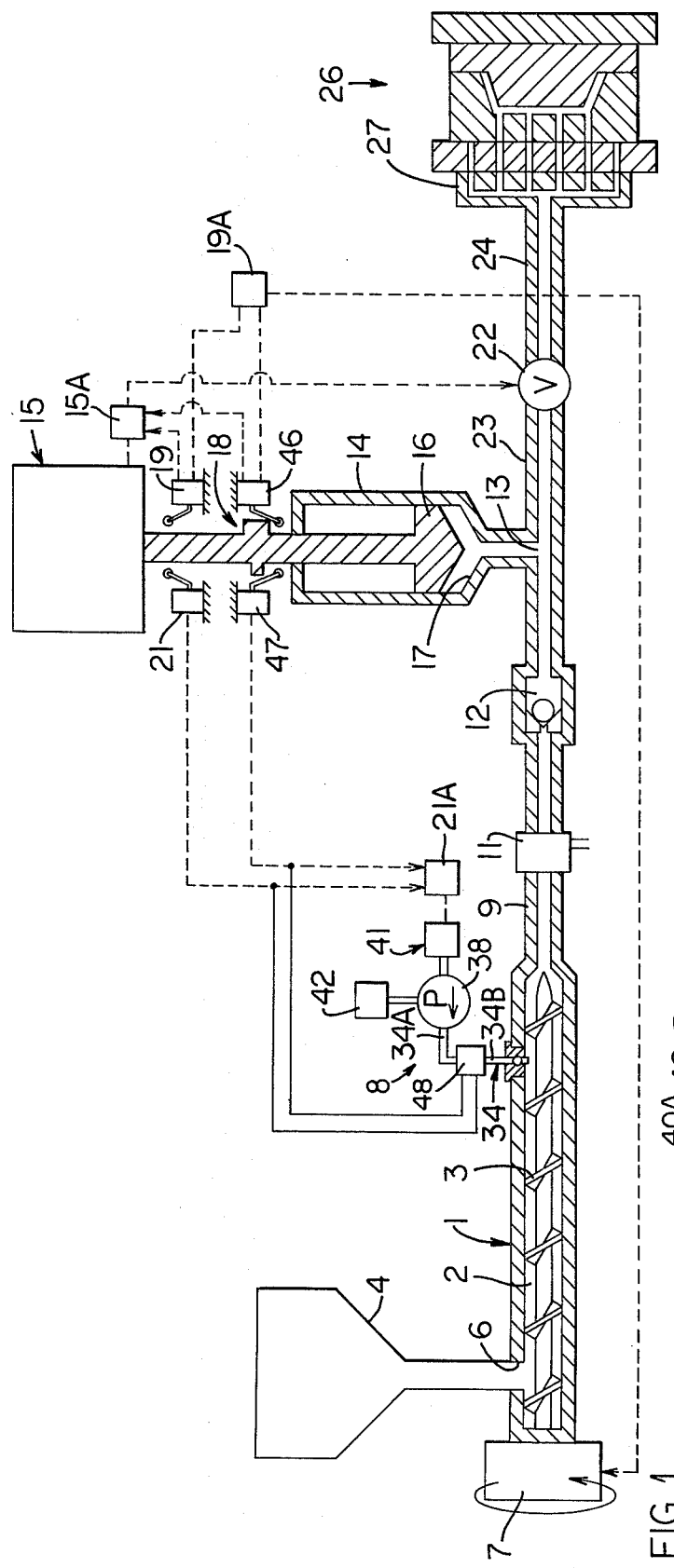
FIG. 1 is a schematic view in central section of apparatus capable of carrying out the method aspects of the invention and embodying the apparatus aspects of the invention.

The invention involves plasticating a quantity of plastics material, including doing so under conditions of pulsating pressure, introducing into a flowing stream of the plasticated material a series of discreet gaseous bubbles of substantially uniform quantity, adjusting the quantity of gas in said bubbles and the frequency of introduction thereof to produce a foam whose voids are of the size and frequency desired and thereafter effecting further agitation of the plasticating material as to insure a thorough distribution of said bubbles throughout the entire body of plastics material.

Aspects of the invention are accomplished by means for effecting the plasticating of plastics material and effecting a flow thereof through a confined zone, such as by a screw or by a ram and torpedo combination. A pump operating at a high rate of speed, such as 300–500 strokes per minute, injects substantially uniform quantities of a selected gas into the flowing mass of plastics material and does so at a pressure developing with each stroke from substantially zero to a level sufficiently above that of the plastics material as to assure injection of the gas thereinto regardless of the pressure existing in the plastics material at any given moment. By appropriately relating the speed of flow of the plastics material, the speed of the pump and the amount of gas injected with each stroke of the pump, the size and frequency of the bubbles within the plastics material may be selected and controlled. Subsequent agitation of the plastics material may be carried out in any desired manner, such as by further working by a screw, by driving the bubble containing plastics material through one or more small orifices or by somewhat releasing the pressure thereon either as same enters into an injection cylinder and/or as same enters into a mold.

DETAILED DESCRIPTION

Inasmuch as the invention will be sufficiently, and best, understood with reference to one specific apparatus by which same is practiced, the description will first proceed with a description of one such apparatus and its mode of operation. It will be understood, however, that reference to this specific apparatus is by way of illustration only and a variety of other specific devices will readily occur to those skilled in the art as alternate means insofar as the apparatus is concerned. Hence, insofar as the method aspects of the invention are concerned, the reference hereinafter to certain specific apparatus will be considered as illustrative only and not as limiting.

Referring therefore to such apparatus, there is provided plasticating means 1 which in this embodiment comprises a plasticating chamber 2 having a screw 3 rotatably mounted therein. A hopper 4 communicates at 6 with the interior of the chamber 2 in a conventional manner for introducing plastics pellets from said hopper into said chamber. Drive means 7 of any conventional type are provided for rotating the screw 3.

Passing for the moment the gaseous injection means 8, which will be further discussed hereinafter, the chamber 2 discharges into a conduit 9, preferably passing through a conventional safety release device 11 and thence through a check valve 12 to the entrance 13 to a plastics accumulator and injection cylinder 14. A ram 16 is slidably positioned within the chamber 17 defined by the cylinder 14 and said ram is provided with any conventional actuating mechanism 15 operable in any conventional manner. The ram also carries in a conventional manner limit switch actuators which are schematically indicated at 18 for operating limit switches 19, 21, 46 and 47 discussed further hereinafter. A valve 22 is provided in a line 23 extending from the above-mentioned entrance 13 and a further line 24 extends from the valve 22 to a mold assembly 26. The ram actuating mechanism 15 and valve 22 are preferably automatically operated, in concert, by any conventional means, wherein the valve 22 is closed as the ram retracts (upwardly in FIG. 1) and open as the ram extends.

In the embodiment here illustrated, the mold assembly includes a distribution manifold 27 by which plastics material from the line 24 is distributed into a plurality of nozzles for supplying a mold in a conventional manner from a plurality of gates. This is, of course, conventional design for supplying large molds and if the apparatus is used for supplying a relatively small mold, the line 24 will communicate through a lesser number of gates, or only one gate, to the mold as desired.

Figure 2:
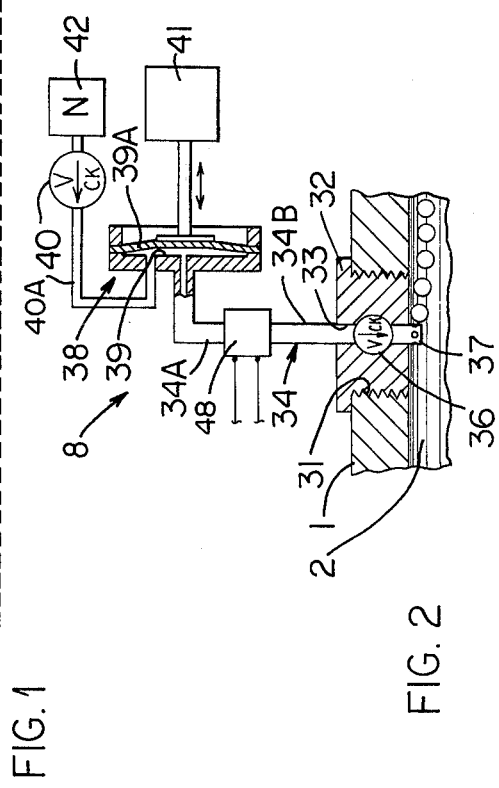
FIG. 2 is a fragmentary enlargement of the portion of FIG. 1 in the zone of the gas injection.

Returning now to the gas injection means 8, a wall of the plasticating cylinder 1, defining the chamber 2, has an opening 31 (FIG. 2) in which is inserted, as by threading thereinto, a pipe retaining and guiding plug 32. An opening 33 is provided through said plug 32 and a gas injection pipe 34 passes through said opening and is arranged in sealed relationship thereto. A check valve 36 is provided in said pipe as close to the plug 32 as feasible, preferably within said plug, and the lower end 37 of said pipe extends slightly into the chamber 2 as further detailed hereinafter. The check valve may be of any convenient type but should be located within a heated portion of the apparatus, such as within the plug 32 and thereby within the wall defining the chamber 2. Thus, when the screw is stopped between cycles of operation and no gas is being ejected from the pipe 34, which results in plastics material going up the pipe 34 to the check valve, said material will remain moldable and capable of being ejected by the next pulse of gas coming out of the pipe 34.

The upper end of the pipe 34 connects to suitable pressure generating means 38, such as a piston pump or a diaphragm pump, a diaphragm pump being assumed for illustrative purposes in the drawing. Said diaphragm pump 38 defines a chamber 39 closed at one side by a diaphragm 39A. The chamber 39, with the length of pipe 34 extending from said chamber to the check valve 36, is of precisely known volume and all or substantially all of that portion of said volume within the pump 38 can be reduced to, or close to, zero by proper manipulation of the diaphragm 39A. A conventional source 42 of gas connects to the chamber 39 through a supply conduit 40A including a further check valve 40. Drive means schematically illustrated at 41 are provided for effecting high-speed reciprocal operation of the diaphragm 39A whereby, in a known manner, a precisely controllable quantity of gas may be withdrawn from the source 42 into the chamber 39 by a first, here rightward, movement of the diaphragm and said portion may then be expelled by a second, here leftward, movement of the diaphragm out from the chamber 39 into the pipe 34, past the check valve 36 and into the chamber 2. It will be understood that the pipe portion 34A from the pump 38 to the bleed off valve 48 and the pipe portion 34B from the bleed off valve 48 to the outlet end 37 will all be made as short as possible to improve the accuracy of operation of the apparatus but a pipe length from the pump to the outlet end 37 of as much as four feet has been used satisfactorily with a pump whose chamber 39 defined approximately ¾ of a cubic inch of space.

The pump drive means 41 is preferably arranged for adjustability through a wide range of reciprocal speeds but it is believed that for most applications a range of from about 200 to about 500 reciprocations per minute will be an ample range and a range somewhat less than that will probably be acceptable. In at least one commercial embodiment said pump successfully operated in the system described at 350 reciprocations per minute.

The pump should have a pressure delivering capacity substantially in excess of the highest pressure expected to be generated within the plasticating chamber 2 in order that gas may be injected from the pipe end 37 quickly and with certainty into the plastics material in the chamber 2. In one embodiment utilizing high-impact polystyrene where the pressures within the screw chamber 2 varied from about 2800 psi to about 3200 psi, the pump operated successfully with a maximum capacity of 5750 psi.

Figure 3:
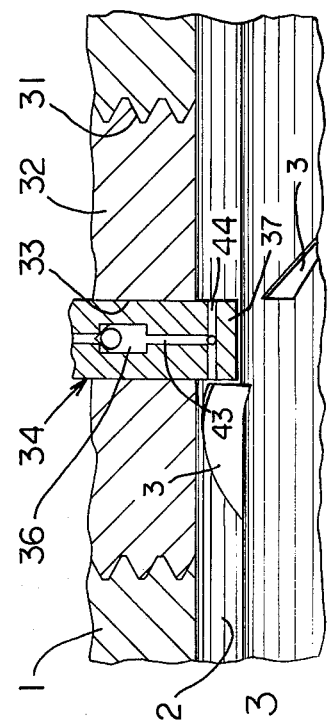
FIG. 3 is a detail of the gas injection nozzle.

The pipe end 37 may be formed to define nozzles having any of a number of possible designs. In one successful embodiment, as illustrated in FIG. 3, the central channel 43 of said pipe terminated in a plurality, in this embodiment four, of radially extending channels 44. In said embodiment, the four channels 44 were spaced 90 degrees from each other, although other numbers of channels and other spacings thereof, not necessarily equal, are entirely conceivable within the scope of the invention.

Both the screw drive means 7 and the pump drive means 41 are operated by conventional means including the limit switches 19 and 21 as well as the further limit switches 46 and 47. Thus, as the ram 16 moves backwardly in response to the flow of plastics material into the chamber 17, it will eventually strike the limit switches 19 and 21 and stop the operation of both the screw drive means 7 and the pump drive means 41. As the ram extends (downwardly in FIG. 1) to expel plastics material from the chamber 17 to the mold, the limit switches 46 and 47 will be actuated whereby to start both the screw drive means and the pump drive means. The screw limit switches 19 and 46 can control stopping and starting of the screw drive 7, for example through the path indicated in broken lines and including conventional relay circuitry indicated by the block 19A. Similarly, the pump limit switches 21 and 47 can control stopping and starting of the pump drive 41 for example through conventional relay circuitry schematically indicated by the block 21A. Conventional circuitry 21A of any desired type may be employed. As but one example, switches 21 and 47 may be normally spring biased open and closed by contact of the actuator 18, closure of each such limit switches 21 and 47 energizing corresponding relays to respectively open and close an electric power supply to the pump drive 41. The circuitry 19A may be similar.

Normally, since it requires slightly more time to stop the screw, as well as to start the screw, than to stop or start the pump, the limit switch causing the screw drive means 7 to stop will be actuated slightly before the limit switch causing the pump drive 41 to stop and for the same reason the limit switch causing the screw drive means to start will be actuated slightly before the limit switch causing the pump drive means 41 to start. However, the order in which these respective drive means are caused to start and/or stop, and the time lag caused therebetween are matters of individual adjustment under given conditions of operating the apparatus and may be chosen as required.

The actuating means 15 for the ram 16 may include, for example, a single-acting hydraulic cylinder (not shown) actuable to extend the ram (lower in FIG. 1), and allowing the ram to be freely retracted by material forced into the chamber by the screw 3. The valve 22 may be a conventional on-off solenoid valve. Control of hydraulic pressure to the ram actuating means 15 may be by suitable solenoid valving (not shown). Such ram valving and the valve 22 may be, if desired, controlled by limit switches responsive to ram extension and retraction, through a conventional relay circuitry control 15A. Control 15A may, for example, be responsive to additional contacts of limit switches 19 and 46. The control 15A may be similar to control 19A, but arranged to extend ram 16 and open valve 22 upon actuation of limit switch 19, and permit retraction of ram 16 and close valve 22 upon actuation of switch 46. Conventional manual controls for elements 7, 41, 15 and 22 may be employed in addition to, or instead of, the discussed automatic controls, particularly to initiate and stop cycling of the apparatus. However, the present invention is not directly concerned with the specific apparatus for automatically controlling the pump drive 41, screw drive 7, ram actuating means 15 and valve 22, and conventional expedients can be employed as long as compatible with the method and apparatus of the present invention as described herein.

It will, of course, be also recognized that the appropriate flight of the screw 3 will be interrupted in the region of the pipe end 37 as needed to clear same as the screw is rotating.

Considering now the operation of the apparatus, both for its own sake and as illustrative of one means for carrying out the method, plastics pellets of any desired type are supplied to the hopper 4 and introduced therefrom into the chamber 2 of the plasticating cylinder 1. Said pellets are in any conventional manner heated, rendered flowable and, again skipping for the moment the function of the gas injection means 8, said plastics material passes via the conduit 9, the relief valve 11 and the check valve 12 to the entrance point 13 for the injection cylinder 14. With the valve 22 closed by appropriate automatically controlled means (as at 15A), said plastics material will, under the pressure generated by the screw 3, pass into the injection chamber 17 and push the ram 16 backwardly until the limit switches 19 and 21 are both actuated. This stops the operation of the extruder screw 3, opens the valve 22 and operates the power means 15 by which the injection ram 16 is advanced in any known manner and drives the plastics material from the injection chamber 17 through the valve 22 and into the mold.

At the end of its advancement stroke, the ram actuates the limit switches 46 and 47 which again starts the screw drive means 7 and the pump 38 and closes the valve 22, and the cycle commences again.

Turning now to the operation of the gas injection means in more detail, it will be recognized that the plastics material is rendered into a flowable state by the time it reaches the pipe end 37 and all traces of the original pellets have disappeared. As said plastic flows past said pipe end 37, the high frequency operation of the pump 38 causes individual quantities of gas to be forceably ejected from each of the ports at which the passageways 44 terminate and thereby into the stream of plastics material flowing thereby. Inasmuch as such ejection of the gas results from separate and indivudial strokes of the pump diaphragm 39A, said quantities of gas are separate from each other and form individual bubbles within the plastics material which bubbles are carried away from the pipe end 37 by the continuing flow of the plastics material. Where a screw is used as the plasticating device, the plastics material is moving circumferentially as well as axially and hence even though the introduction thereof is all from a single point the bubbles are well distributed through the plastics material by the time same reaches the entry into the conduit 9. As said plastics material then passes through the conduit 9, past the check valve 12, and through the entrance 13 into the injection chamber, then later through the passageway 23 and through the various passageways associated with the mold, same becomes thoroughly and repeatedly agitated and said bubbles are thoroughly and uniformly distributed therethrough.

Further, it should be noted that with a given plastics material having a given viscosity, it will require a rather substantial but constant differential in pressure between the gas and the plastics material to introduce the gas thereinto. It will be further understood that in the normal operation of the screw-type plasticating device, the pressure created within the plastics material at any given point, such as adjacent the pipe end 37, will vary measurably, often as much as 25%, from moment to moment as the plastics material flows thereby. Thus, if the gas were introduced to the pipe end 37 at a constant and continuing pressure, the quantity of gas introduced into the plastics material at any given instant would vary inversely to the pressure existing in the plastics material at such point and at such instant. However, with the system herein described, for any given cycle of the pump 38, the gas pressure applied to the plastics material commences at a relatively low value, such as a fractional atmosphere, namely the pressure within the chamber 39 at the end of a suction stroke of the diaphragm 39A and increases to whatever pressure is generated within the gas source 42, such as 5500 psi. The latter is always much more than the pressure appearing at any time within the plastics material adjacent the pipe end 37, which is usually of the order of 2000-2500 psi. The gas pressure then, during a power stroke of the diaphragm 39A, rises rapidly with a potential of creating a pressure on the gas in the chamber 39 and within the pipe 34 of a value much in excess of the pressure within such plastics material. Thus, assuming for example that it requires a 50 psi difference in pressure between the gas and the plastics material to inject a bubble of such gas into such plastics material, the gas will quickly attain such 50 psi differential regardless of the pressure existing at any given moment in the plastics material and when such differential is obtained, the gas will be so injected and a bubble so formed. It is recognized, of course, that such differential is not a precise figure but rather comprises a relatively narrow range. However, for purposes of describing the invention, it is conveniently considered as being a differential of a single value. Therefore, even though the pressure within the plastics material in the region of the pipe end 37 varies substantially from moment to moment, the gas pressure will rise at any given moment to a value sufficient to be injected in bubbles of uniform, or substantially uniform, size and frequency. Thus, the gas injection effectively follows the changes in the pressure within the plastics material with the resulting desirable uniformity throughout of bubble size and frequency as aforesaid.

It will be recognized that while the apparatus here described is highly effective for performing the method of the invention, insofar as the broader aspects of the method are concerned, a variety of other devices may be used to practice same. For example, the diaphragm pump 38 illustrated may be replaced by a piston pump or by any other pump capable of delivering separate pulses of gas under pressures varying with each pulse from a point substantially less than any pressure expected to be developed within the plastics material to a potential level substantially higher than any such pressure. Likewise, other types of plasticating devices may be utilized, including for example a ram driving plastics material past a torpedo and thence past the gas injection means as herein described. This method of plasticating, however, is somewhat less controllable than the use of a screw as above described and hence is normally not a preferred procedure.

While it is desirable that the volumetric capacity of the pump at the discharge pressure be greater than the capacity at such pressure of the pipe 34 between the pump and the discharge ports of the pipe, the system will work even if the pipe capacity is greater. In such latter case, a discharge stroke of the pump will raise the pressure in the pipe sufficiently to effect a momentary discharge therefrom into the plastics material and thereby to form one or more bubbles, whereupon the discharge will cease until the next stroke of the pump. However, the total length of the pipe should not be such as to prevent a pulsating pressure at its output and the shorter the pipe the better. A single stroke of the pump should not eject more gas than that sufficient to form only a few bubbles, such as preferably one bubble and seldom if ever more than about ten. An ejected quantity of gas larger than that required for more than one bubble will usually be broken up into small bubbles by subsequent working of the plastics material as it is driven through the various openings of reduced cross-section downstream from the pipe 34, However, this can be relied upon only to a limited extent, if at all, for good, uniform results, and hence the quantity of gas ejected by a single stroke of the pump should be kept small as aforesaid.

Further, in all cases the volumetric capacity of the pipe portion 34B between the check valve 36 and the pipe end 37 must be less than the volume of gas ejected by one stroke of the pump at the pressure required for the gas to penetrate the plastics material. Otherwise, plastics material entering into the pipe portion 34B between pump strokes will fill such pipe portion (less the compressed volume of any gas still present therein) and will not be ejected by the next pump stroke. While theoretically it would appear that gas under substantially an ejecting pressure would be trapped in pipe portion 34B, such that the plastics material would not enter appreciably thereinto, as a practical matter the gas volume is so small in all of pipe 34, and must be so for reasons aforesaid, that by the time the check valve 36 closes much of the gas in pipe portion 34B will have leaked therepast and little will remain in pipe portion 34B. Thus, between gas ejection strokes of the pump, and even more so when the extruder and pump are stopped during a mold filling portion of the cycle, plastics material will enter into pipe portion 34B to a point at or near the check valve 36, and will need to be ejected on the next stroke of the pump in order to inject a gas bubble into the plastics material in the chamber 2. Hence, the volumetric relationships are required as set forth above.

If desired, and preferably, a bleed-off valve 48 may be applied to the pipe portion 34A to reduce its pressure during a plastics injection portion of the cycle and prevent the possibility of an oversize bubble forming in the plastics material during such time. If such is used, it may advantageously be opened by limit switch 21 simultaneously with the stopping of pump 38 and closed by limit switch 47 simultaneously with the starting of such pump. Further, it will usually be desirable if such venting of pipe portion 34A is only to a reduced or threshold pressure below that which will form a bubble as above described, and not necessarily to an atmospheric pressure.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. An apparatus for creating a foamed plastics material, the combination comprising:
    a passageway comprising a wall bounding a chamber and plasticating means associated therewith for plasticating a plastics material while simultaneously causing same to travel through said passageway;
    a source of gas inert to said plastics material having at least one gas outlet;
    conduit means connected to said passageway through said at least one gas outlet for routing said gas to said passageway, said conduit means projecting beyond said wall into said chamber with said gas outlet offset from said wall into the path of plasticated material through said chamber;
    a check valve in said conduit means and oriented to permit the passage of said gas to said passageway but prevent the passage of plasticated plastics material in the reverse direction;
    means operatively associated with said conduit means for supplying a train of discrete gas pulses from said source through said conduit means to said passageway at a gas pulse pressure sufficiently exceeding the instantaneous plastics material pressure as to inject a discrete quantity of gas into said material travelling past said gas outlet, and at a gas pressure between pulses sufficiently lower as to stop gas entry into said material, said supplying means comprising an intermittent output, positive displacement pump and means operatively associated with said pump for repetitively cycling said pump at a gas pulse frequency which is high compared to the rate at which the passageway is refilled with fresh plastics material and synchronized with the desired rate of gas bubble ejection at said gas outlet, the gas bubble ejection rate being a function of the pulse frequency and number of gas outlets from said conduit means, and the quantity of gas per bubble is closely controllable, the volumetric capacity of the portion of said conduit means between said check valve and said passageway being less than the volumetric capacity of said pump.

2. The device defined in claim 1 wherein the volumetric capacity of said pump corresponds to a single gas bubble for producing one gas bubble in said plastics material per pump cycle.

3. The device defined in claim 1 wherein the volumetric capacity of said pump is sufficiently limited as to produce less than ten bubbles in said plastics material per pump cycle.

4. The device defined in claim 1 wherein the projecting portion of said conduit means has a closed end and a side through which at least one gas outlet communicates with said passageway.

5. The device defined in claim 1 wherein said plasticating means is a screw positioned within and extending along said passageway.

6. The device defined in claim 7 wherein a section of said screw is removed to accommodate such projecting portion of said conduit means.

7. The device defined in claim 1 including accumulating means receiving said foamed plastics material to a preselected quantity thereof and means automatically operable on the attainment therein of such quantity for substantially simultaneous terminating operation of said plasticating means and said pump.

8. The device defined in claim 7 wherein operation of said plasticating means is terminated slightly ahead of termination of operation of said pump.

9. The device defined in claim 7 wherein the pressure between said pump and said check valve is at least partially vented substantially simultaneously with the stopping of said pump.

10. The device defined in claim 1 wherein the volume of said conduit means is small compared to the displacement of said pump and the maximum pressure capability of the pump substantially exceeds the expected maximum pressure of the material in said passageway adjacent said conduit means, such that the quantity of gas injected per pump cycle is substantially constant despite substantial variation in the instantaneous plastics material pressure at the gas outlet end of said conduit means.

11. The device of claim 1 wherein the pump has a per cycle displacement substantially equal to the quantity of gas per bubble injected in said material multiplied by the number of said gas outlets.

12. The device of claim 1 wherein the pulse rate is in the range of 200 to 500 gas pulses per minute and the pump displacement per cycle is about three-quarters cubic inch.

* * * * *

UNITED STATES PATENT AND TRADEMARK OFFICE
CERTIFICATE OF CORRECTION

PATENT NO. : 4 043 715
DATED : August 23, 1977
INVENTOR(S) : James W. Hendry

It is certified that error appears in the above-identified patent and that said Letters Patent are hereby corrected as shown below:

Column 9, line 15; delete "7" and replace with ---5---.

Signed and Sealed this

Twenty-second Day of November 1977

[SEAL]

Attest:

RUTH C. MASON
Attesting Officer

LUTRELLE F. PARKER
Acting Commissioner of Patents and Trademarks